United States Patent [19]
Yard

[11] Patent Number: 5,968,162
[45] Date of Patent: *Oct. 19, 1999

[54] MICROPROCESSOR CONFIGURED TO ROUTE INSTRUCTIONS OF A SECOND INSTRUCTION SET TO A SECOND EXECUTE UNIT IN RESPONSE TO AN ESCAPE INSTRUCTION

[75] Inventor: Christopher J. Yard, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/626,473

[22] Filed: Apr. 2, 1996

[51] Int. Cl.⁶ .................................................. G06F 9/38
[52] U.S. Cl. ........................... 712/203; 712/214; 712/212
[58] Field of Search ................................ 395/595, 200.05, 395/800, 598, 384, 385, 388, 389, 379, 391; 712/214, 245, 212, 203

[56] References Cited

U.S. PATENT DOCUMENTS

| | | | |
|---|---|---|---|
| 4,095,266 | 6/1978 | Carubia et al. | 395/595 |
| 4,554,627 | 11/1985 | Holland et al. | 395/571 |
| 4,763,294 | 8/1988 | Fong | 364/748 |
| 4,870,614 | 9/1989 | Quatse | 395/200.05 |
| 5,481,743 | 1/1996 | Baxter | 395/800 |

FOREIGN PATENT DOCUMENTS

| | | |
|---|---|---|
| 0 174 231 | 3/1986 | European Pat. Off. . |
| 0 295 646 | 12/1988 | European Pat. Off. . |
| 0 525 831 | 2/1993 | European Pat. Off. . |

OTHER PUBLICATIONS

J. C. Desaultels, "New Instruction and Extended Instruction Handling," IBM Technical Disclosure Bulletin, vol. 21, No. 1, Jun. 1978, New York US, pp. 201–202.

International Search Report for PCT/US 96/19587 dated Apr. 28, 1997.

*Primary Examiner*—Meng-Ai T. An
*Assistant Examiner*—Gautam R. Patel
*Attorney, Agent, or Firm*—Conley, Rose & Tayon; B. Noel Kivlin

[57] ABSTRACT

A microprocessor is provided which detects an escape instruction. The escape instruction indicates that subsequent instructions belong to an alternate instruction set. In one embodiment, the number of subsequent instructions which belong to the alternate instruction set is encoded in the escape instruction. The subsequent instructions are routed to an execution unit or a separate processor for execution. Each instruction sequence within a program may be coded using the instruction set which most efficiently executes the function corresponding to the instruction sequence. In one embodiment, the microprocessor executes the x86 instruction set and the alternate instruction set is the ADSP 2171 instruction set. The escape instruction is defined using a previously undefined opcode within the x86 instruction set. Complex mathematical functions (which are more efficiently executed within a DSP) may be performed more efficiently than previously achievable using the x86 instruction set alone. Portions of the program which may be executed more efficiently using x86 instructions may be coded in the x86 instruction set, while portions of the program which may be executed more efficiently using DSP instructions may be coded in the DSP instruction set.

11 Claims, 6 Drawing Sheets

MICROPROCESSOR CONFIGURED TO ROUTE INSTRUCTIONS OF A SECOND INSTRUCTION SET TO A SECOND EXECUTE UNIT IN RESPONSE TO AN ESCAPE INSTRUCTION

BACKGROUND OF THE INVENTION

1. Field of the Invention

This invention is related to the field of computer systems and microprocessors and, more particularly, to efficient hardware for executing DSP functions within such computer systems and microprocessors.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

Digital signal processors include execution units which comprise one or more arithmetic logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. Many of these mathematical algorithms perform a repetitive multiply and accumulate function in which a pair of operands are multiplied together and added to a third operand. The third operand is often used to store an accumulation of prior multiplications. Therefore, DSP hardware often includes hardware configured to quickly perform a multiply-add sequence. An exemplary DSP is the ADSP 2171 available from Analog Devices, Inc. of Norwood, Mass.

Many instruction sequences (or "routines") which perform complex mathematical operations may be more efficiently performed in a DSP instruction set such as that employed by the ADSP 2171 than in the x86 instruction set. Microprocessors often execute instructions from the x86 instruction set, due to its widespread acceptance in the computer industry. It is desirable to code the various instruction sequences of a program in the instruction set (DSP or x86, for example) which is most efficient at performing the task the instruction sequence represents. Furthermore, a method is desired for indicating the instruction set in which each instruction sequence in a particular program is coded. As used herein, an "instruction set" refers to a plurality of instructions defined for execution by a particular microprocessor. Each instruction within the instruction set is assigned a unique encoding identifying the instruction from the other instructions within the instruction set.

SUMMARY OF THE INVENTION

The problems outlined above are in large part solved by a microprocessor configured to detect an escape instruction. The escape instruction indicates that subsequent instructions belong to an alternate instruction set. In one embodiment, the number of subsequent instructions which belong to the alternate instruction set is encoded in the escape instruction. The subsequent instructions are routed to an execution unit or a separate processor for execution. Advantageously, a program may be coded using multiple instruction sets. Each instruction sequence within the program may be coded using the instruction set which most efficiently executes the function corresponding to the instruction sequence. The program may be executed more quickly than an equivalent program coded entirely in a single instruction set.

In one embodiment, the microprocessor executes the x86 instruction set and the alternate instruction set is the ADSP 2171 instruction set. The escape instruction is defined using a previously undefined opcode within the x86 instruction set. Advantageously, complex mathematical functions (which are more efficiently executed within a DSP) may be performed more efficiently than previously achievable using the x86 instruction set alone. Portions of the program which may be executed more efficiently using x86 instructions may be coded in the x86 instruction set, while portions of the program which may be executed more efficiently using DSP instructions may be coded in the DSP instruction set.

Broadly speaking, the present invention contemplates a microprocessor comprising an instruction cache coupled to an instruction decode unit. The instruction cache is configured to store a plurality of instructions. The plurality of instructions comprises at least one instruction from a first instruction set and at least one instruction from a second instruction set. The instruction decode unit receives the plurality of instructions from the instruction cache and is configured to identify an escape instruction indicating subsequent instructions are from the second instruction set. Additionally, the instruction decode unit comprises a first bus for dispatching instructions from the first instruction set and a second bus for dispatching instructions from the second instruction set.

The present invention further contemplates an escape decoder unit, comprising a first bus, a second bus, a plurality of escape decoder circuits, and a dispatch control circuit. The first bus is provided for receiving a plurality of instructions including at least one instruction from a first instruction set, an escape instruction indicating that subsequent instructions are from a second instruction set, and at least one instruction from the second instruction set. The second bus is provided for dispatching instructions from the second instruction set. Coupled to the first bus, each of the plurality of escape decoder circuits is configured to detect the escape instruction. The dispatch control circuit is coupled to receive an indication of the escape instruction and the plurality of instructions from the plurality of escape decoder circuits. Additionally, the dispatch control circuit is configured to dispatch instructions upon the second bus when the escape instruction is detected.

The present invention still further contemplates a method for executing instructions from at least a pair of instruction sets within a computer system. A plurality of instructions are fetched from a main memory into a microprocessor. An escape instruction is detected within the plurality of instructions. Instructions are executed from a first of the pair of instruction sets if the escape instruction is not detected. Conversely, instructions are executed from a second of the pair of instruction sets if the escape instruction is detected.

BRIEF DESCRIPTION OF THE DRAWINGS

Other objects and advantages of the invention will become apparent upon reading the following detailed description and upon reference to the accompanying drawings in which.

Figure 1:
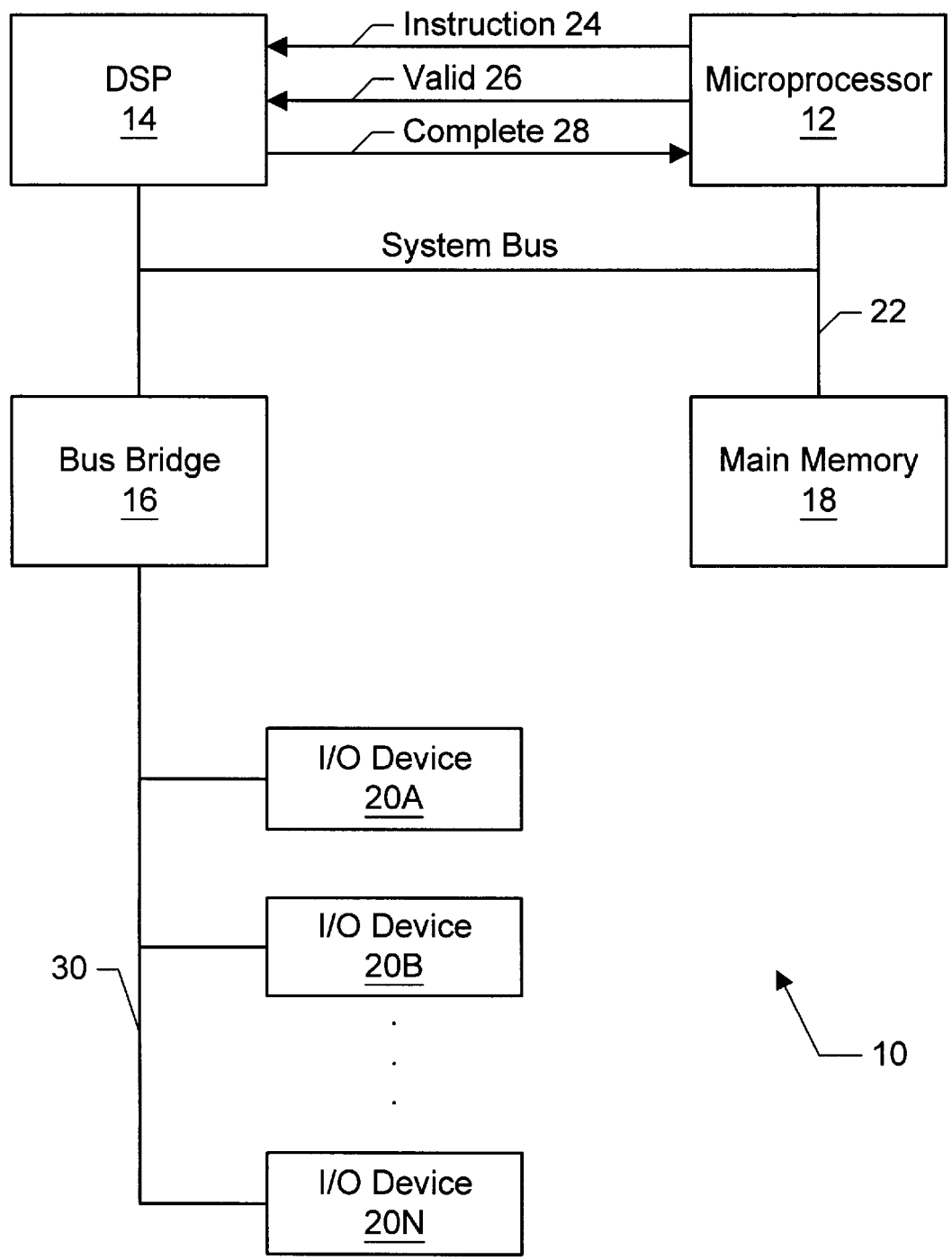
FIG. 1 is a block diagram of a computer system including a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a computer system 10 is shown. Computer system 10 includes a microprocessor 12, a DSP 14, a bus bridge 16, a main memory 18, and a plurality of input/output (I/O) devices 20A–20N (collectively referred to as I/O devices 20). A system bus 22 couples microprocessor 12, DSP 14, bus bridge 16, and main memory 18. Additionally, microprocessor 12 and DSP 14 are coupled together via an instruction bus 24, a valid conductor 26, and a complete conductor 28. I/O devices 20A–20N are coupled to bus bridge 16 via an I/O bus 30.

Generally speaking, microprocessor 12 is configured to execute an instruction set including an escape instruction. The escape instruction indicates that instructions subsequent to the escape instruction belong to an alternate instruction set. In the embodiment shown, the subsequent instructions are encoded in the instruction set employed by DSP 14. When an escape instruction is detected, microprocessor 12 transmits the subsequent instructions to DSP 14 upon instruction bus 24. Additionally, a signal upon valid conductor 26 is asserted to indicate that an instruction is being conveyed. DSP 14 receives and executes the instruction. Subsequent to the completion of the instruction, DSP 14 asserts a signal upon complete conductor 28. Microprocessor 12 may then dispatch another instruction to DSP 14, until the instructions encoded in the instruction set of DSP 14 are exhausted. Advantageously, the instructions are performed within DSP 14 instead of microprocessor 12. Performance of the computer system may be increased by executing each instruction sequence using the instruction set most efficient for the instruction sequence.

In one embodiment, the escape instruction encodes the number of subsequent instructions which are coded in the alternate instruction set. Microprocessor 12 transmits the number of instructions provided by the escape instruction to DSP 14. It is noted that DSP 14 may buffer instructions prior to execution, such that DSP 14 is capable of receiving additional instructions prior to completing execution of a particular instruction. When including buffering, DSP 14 is configured to assert the complete signal immediately upon receiving an instruction until the buffer is full.

As used herein, the term "escape instruction" refers to an instruction defined in the instruction set executed by microprocessor 12. The instruction is defined to indicate that instructions following the escape instruction (in program order) belong to the alternate instruction set. Furthermore, according to one embodiment, the escape instruction includes an immediate field encoding the number of subsequent instructions which belong to the alternate instruction set.

In addition to escape instructions, microprocessor 12 executes other instructions and operates upon data. The data and instructions are typically stored in main memory 18. Microprocessor 12 is configured to communicate with I/O devices 20 through bus bridge 16. In one embodiment, microprocessor 12 employs the x86 microprocessor architecture. The escape instruction is encoded utilizing a previously undefined opcode within the x86 instruction set.

It is noted that, if an instruction sequence communicates values to another instruction sequence comprising instructions from another instruction set, the communication may be effected through memory locations in main memory 18. One instruction sequence may store the communicated values into the memory locations, and the other instruction sequence may load these values. In this manner, the instruction sets may have dissimilar register sets and methods for accessing memory, and yet still communicate values between them.

In one embodiment, DSP 14 includes a digital signal processing core similar to the ADSP-2171 from Analog Devices, Inc. Additionally, DSP 14 includes circuitry for receiving instructions upon instruction bus 24 when the valid signal upon valid conductor 26 is asserted. DSP 14 may perform bus transactions upon system bus 22 to retrieve data to be operated upon from main memory 18, in one embodiment. In another embodiment, DSP 14 is coupled to a separate memory (not shown) from which it retrieves operands. In yet another embodiment, DSP 14 is included within an I/O device 20 upon I/O bus 30.

Bus bridge 16 is provided to assist in communications between I/O devices 20 and devices coupled to system bus 22. I/O devices 20 typically require longer bus clock cycles than microprocessor 12 and other devices coupled to system bus 22. Therefore, bus bridge 16 provides a buffer between system bus 22 and input/output bus 30. Additionally, bus bridge 16 translates transactions from one bus protocol to another. In one embodiment, input/output bus 30 is an Enhanced Industry Standard Architecture (EISA) bus and bus bridge 16 translates from the system bus protocol to the EISA bus protocol. In another embodiment, input/output bus 30 is a Peripheral Component Interconnect (PCI) bus and bus bridge 16 translates from the system bus protocol to the PCI bus protocol. It is noted that many variations of system bus protocols exist. Microprocessor 12 may employ any suitable system bus protocol.

I/O devices 20 provide an interface between computer system 10 and other devices external to the computer system. Exemplary I/O devices include a modem, a serial or parallel port, a sound card, etc. I/O devices 20 may also be referred to as peripheral devices. Main memory 18 stores data and instructions for use by microprocessor 12. In one embodiment, main memory 20 includes at least one Dynamic Random Access Memory (DRAM) cell and a DRAM memory controller.

It is noted that although computer system 10 as shown in FIG. 1 includes one microprocessor, other embodiments of computer system 10 may included multiple microprocessors similar to microprocessor 12. Similarly, multiple DSPs such as DSP 14 may be included within computer system 10. It is further noted that the above discussion refers to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Figure 2:
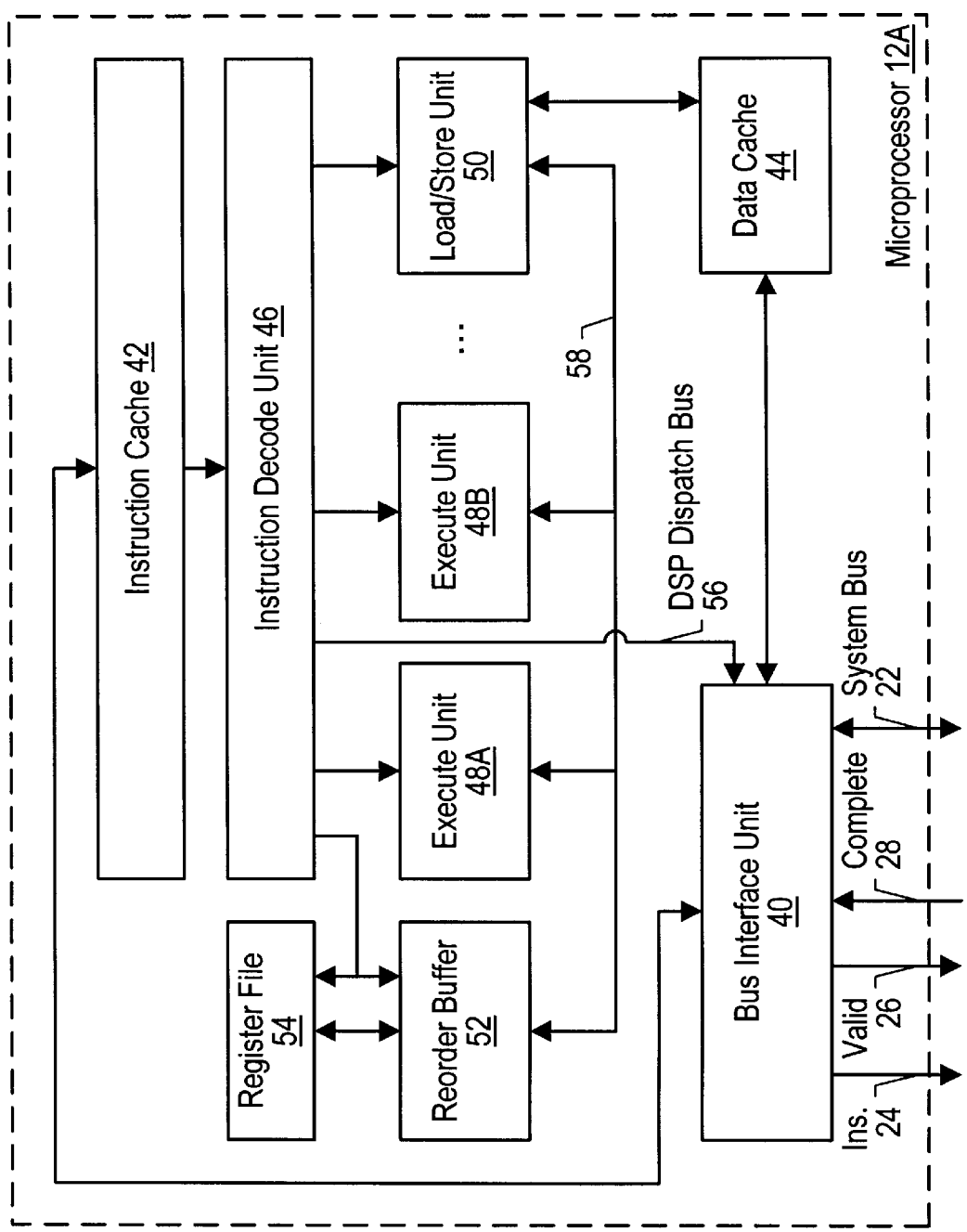
FIG. 2 is a block diagram of one embodiment of the microprocessor shown in FIG. 1, including an instruction decode unit.

Turning now to FIG. 2, one embodiment of microprocessor 12 (microprocessor 12A) is shown. Microprocessor 12A includes a bus interface unit 40, an instruction cache 42, a data cache 44, an instruction decode unit 46, a plurality of execute units including execute units 48A and 48B, a load/store unit 50, a reorder buffer 52, and a register file 54. The plurality of execute units will be collectively referred to herein as execute units 48, and may include more execute units than execute units 48A and 48B shown in FIG. 2. Additionally, an embodiment of microprocessor 12A may include one execute unit 48. Bus interface unit 40 is coupled to a DSP dispatch bus 56, which is further coupled to instruction decode unit 46. Additionally, bus interface unit 40 is coupled to instruction cache 42 and data cache 44. Instruction bus 24, valid conductor 26, complete conductor 28, and system bus 22 are coupled to bus interface unit 40. Instruction cache 42 is coupled to instruction decode unit 46, which is further coupled to execute units 48, reorder buffer 52, and load/store unit 50. Reorder buffer 52, execute units 48, and load/store unit 50 are each coupled to a result bus 58 for forwarding of execution results. Load/store unit 50 is coupled to data cache 44.

Generally speaking, instruction decode unit 46 is configured to detect escape instructions. If an escape instruction is not detected, instructions are dispatched to execute units 48 and load/store unit 50. If an escape instruction is detected, instruction decode unit 46 transmits the subsequent instructions to bus interface unit 40 upon DSP dispatch bus 56. Upon receipt of an instruction upon DSP dispatch bus 56, bus interface unit 40 transmits the instruction upon instruction bus 24 and asserts a signal upon valid conductor 26. Microprocessor 12A continues subsequent instruction dispatch upon DSP dispatch bus 56 until the number of instructions specified by the escape instruction have been dispatched. Once the requisite number of instructions have been dispatched, instruction dispatch to execute units 48 and load/store unit 50 may resume. Advantageously, each routine may be executed using the instruction set which most efficiently performs the routine.

Instruction cache 42 is a high speed cache memory for storing instructions. It is noted that instruction cache 42 may be configured into a set-associative or direct mapped configuration. Instruction cache 42 may additionally include a branch prediction mechanism for predicting branch instructions as either taken or not taken. Instructions are fetched from instruction cache 42 and conveyed to instruction decode unit 46 for decode and dispatch to an execution unit.

As noted above, instruction decode unit 46 detects escape instructions. In the embodiment shown, instruction decode unit 46 decodes each instruction fetched from instruction cache 42. Instruction decode unit 46 dispatches the instruction to execute units 48 and/or load/store unit 50. Instruction decode unit 46 also detects the register operands used by the instruction and requests these operands from reorder buffer 52 and register file 54. In one embodiment, execute units 48 are symmetrical execution units. Symmetrical execution units are each configured to execute a particular subset of the instruction set employed by microprocessor 12A. The subsets of the instruction set executed by each of the symmetrical execution units are the same. In another embodiment, execute units 48 are asymmetrical execution units configured to execute dissimilar instruction subsets. For example, execute units 48 may include a branch execute unit for executing branch instructions, one or more arithmetic/logic units for executing arithmetic and logical instructions, and one or more floating point units for executing floating point instructions. Instruction decode unit 46 dispatches an instruction to an execute unit 48 or load/store unit 50 which is configured to execute that instruction. As used herein, the term "dispatch" refers to conveying an instruction to an appropriate execution unit or load/store unit for execution of the instruction.

Load/store unit 50 provides an interface between execute units 48 and data cache 44. Load and store memory operations are performed by load/store unit 50 to data cache 44. Additionally, memory dependencies between load and store memory operations are detected and handled by load/store unit 50.

Execute units 48 and load/store unit 50 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 46, execute units 48, and load/store unit 50. Such an embodiment may perform the dispatch function within the centralized reservation station.

Microprocessor 12A supports out of order execution, and employs reorder buffer 52 for storing execution results of speculatively executed instructions and storing these results into register file 54 in program order, for performing dependency checking and register renaming, and for providing for mispredicted branch and exception recovery. When an instruction is decoded by instruction decode unit 46, requests for register operands are conveyed to reorder buffer 52 and register file 54. In response to the register operand requests, one of three values is transferred to the execute unit 48 and/or load/store unit 50 which receives the instruction: (1) the value stored in reorder buffer 52, if the value has been speculatively generated; (2) a tag identifying a location within reorder buffer 52 which will store the result, if the value has not been speculatively generated; or (3) the value stored in the register within register file 54, if no instructions within reorder buffer 52 modify the register. Additionally, a storage location within reorder buffer 52 is allocated for storing the results of the instruction being decoded by instruction decode unit 46. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 48 or load/store unit 50 execute an instruction, the tag assigned to the instruction by reorder buffer 52 is conveyed upon result bus 58 along with the result of the instruction. Reorder buffer 52 stores the result in the indicated storage location. Additionally, execute units 48 and load/store unit 50 compare the tags conveyed upon result bus 58 with tags of operands for instructions stored therein. If a match occurs, the unit captures the result from result bus 58 and stores it with the corresponding instruction. In this manner, an instruction may receive the operands it is intended to operate upon. Capturing results from result bus 58 for use by instructions is referred to as "result forwarding".

Instruction results are stored into register file 54 by reorder buffer 52 in program order. Storing the results of an instruction and deleting the instruction from reorder buffer 52 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 52 discards the instructions subsequent to the mispredicted branch instructions. Instructions thus discarded are also flushed from execute units 48, load/store unit 50, and instruction decode unit 46.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, now abandoned, filed Oct. 29, 1993 by Witt, et al. These documents are incorporated herein by reference in their entirety.

Register file 54 includes storage locations for each register defined by the microprocessor architecture employed by microprocessor 12A. For example, microprocessor 12A may employ the x86 microprocessor architecture. For such an embodiment, register file 54 includes locations for storing the EAX, EBX, ECX, EDX, ESI, EDI, ESP, and EBP register values.

Data cache 44 is a high speed cache memory configured to store data to be operated upon by microprocessor 12A. It is noted that data cache 44 may be configured into a set-associative or direct-mapped configuration.

Bus interface unit 40 is configured to effect communication between microprocessor 12A and devices coupled to system bus 22. For example, instruction fetches which miss instruction cache 42 may be transferred from main memory 18 by bus interface unit 40. Similarly, data requests performed by load/store unit 50 which miss data cache 44 may be transferred from main memory 18 by bus interface unit 40. Additionally, data cache 44 may discard a cache line of data which has been modified by microprocessor 12A. Bus interface unit 40 transfers the modified line to main memory 18.

It is noted that instruction decode unit 46 may be configured to dispatch an instruction to more than one execution unit. For example, in embodiments of microprocessor 12A which employ the x86 microprocessor architecture, certain instructions may operate upon memory operands. Executing such an instruction involves transferring the memory operand from data cache 44, executing the instruction, and transferring the result to memory (if the destination operand is a memory location). Load/store unit 50 performs the memory transfers, and an execute unit 48 performs the execution of the instruction.

Figure 3:
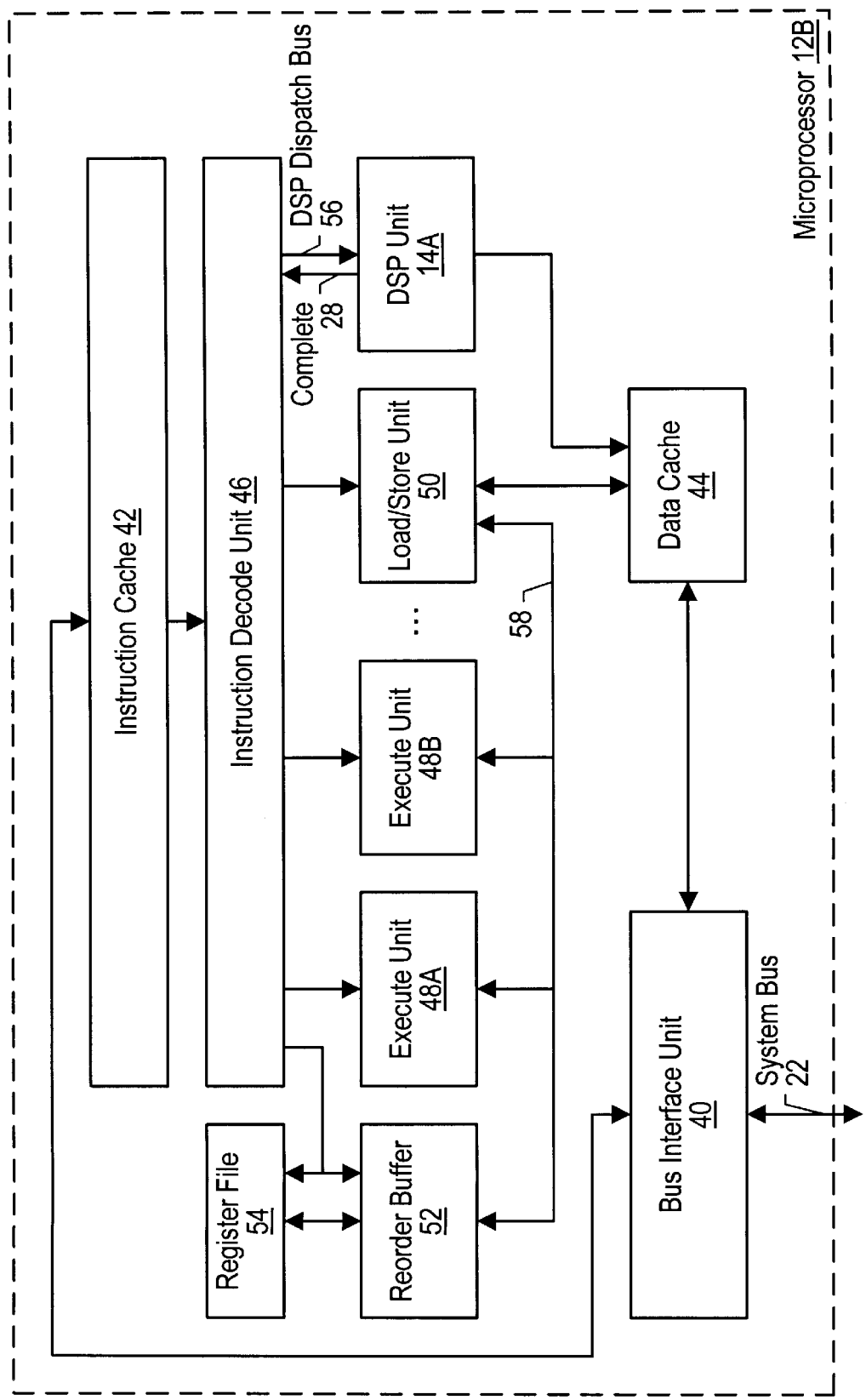
FIG. 3 is a block diagram of another embodiment of the microprocessor shown in FIG. 1, including an instruction decode unit.

Turning now to FIG. 3, a second embodiment of microprocessor 12 (microprocessor 12B) is shown. Like numbered elements in FIGS. 2 and 3 are similar. In addition to the elements shown in FIG. 2, microprocessor 12B integrates DSP 14 (shown in FIG. 1) as a DSP unit 14A. Bus interface unit 40 includes circuitry for effecting communication upon system bus 22, but does not include busses and conductors for communicating with DSP 14 in this embodiment. Instead, DSP unit 14A and instruction decode unit 46 communicate directly. Advantageously, a computer system equipped with microprocessor 12B may eliminate the separate DSP shown in FIG. 1.

DSP unit 14A may be configured similar to DSP 14. However, DSP unit 14A accepts instructions upon DSP dispatch bus 56 from instruction decode unit 46 instead of upon instruction bus 24. Once a dispatched instruction is complete, DSP unit 14A asserts a signal upon complete conductor 28 to instruction decode unit 46. Additionally, DSP unit 14A may be configured to access data cache 44 for data operands. Data operands may be stored in a memory within DSP unit 14A for quicker access, or may be accessed directly from data cache 44 when needed. It is noted that DSP 14A may be configured with buffering similar to DSP 14 or similar to the reservation stations described above.

Additional information regarding microprocessors may be found within the commonly assigned, co-pending patent application entitled "High Performance Superscalar Microprocessor", Ser. No. 08/146,382, now abandoned, filed Oct. 29, 1993 by Witt, et al. Further information regarding microprocessors may be found within the commonly assigned, co-pending patent application entitled "Superscalar Microprocessor Including a High Performance Instruction Alignment Unit", Ser. No. 08/377,843, now abandoned, filed Jan. 25, 1995 by Witt, et al. The disclosures of these patent applications are incorporated herein by reference in their entirety.

Figure 4:
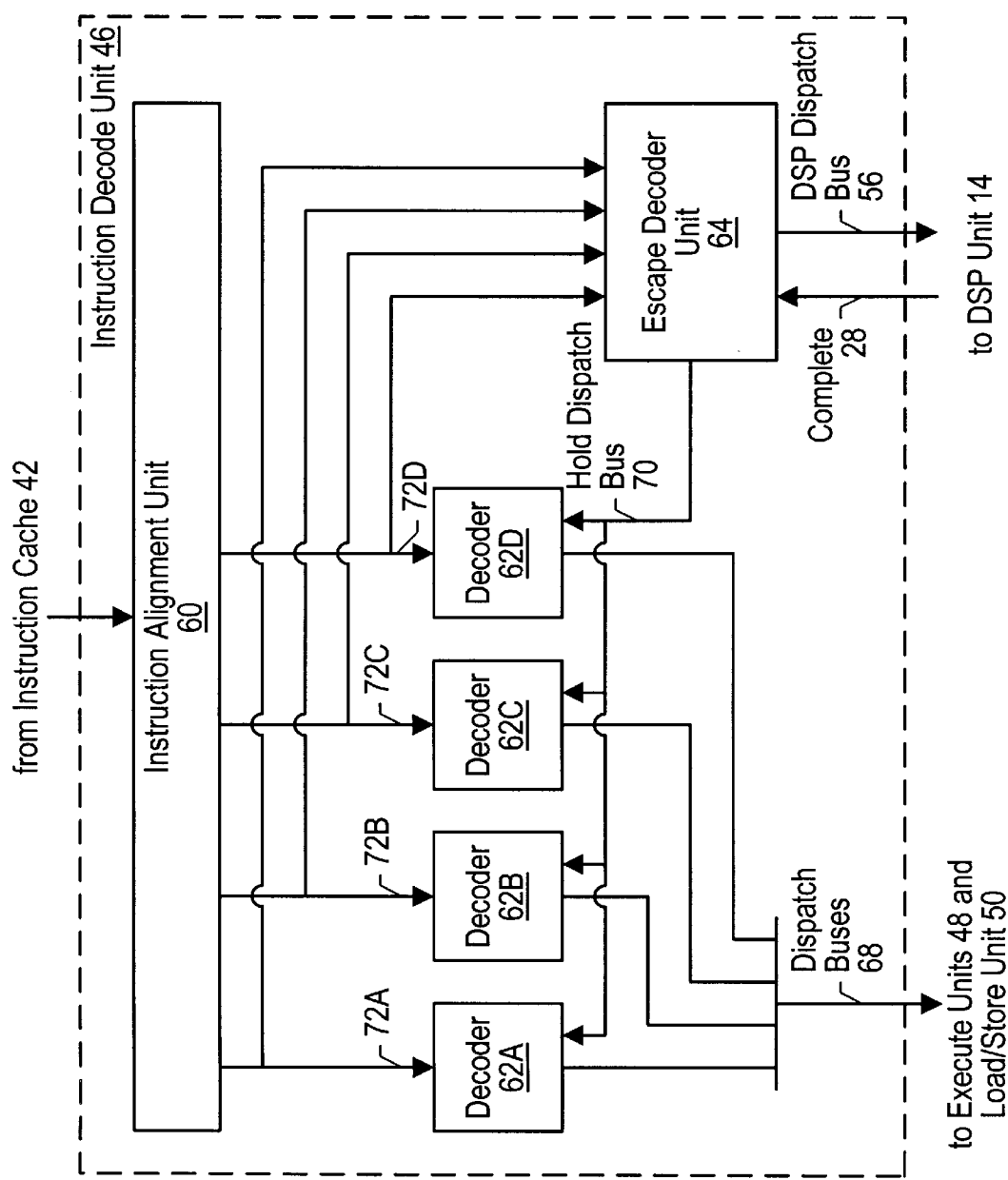
FIG. 4 is a block diagram of one embodiment of the instruction decode unit shown in FIGS. 2 and 3, including an escape decoder unit.

Turning now to FIG. 4, one embodiment of instruction decode unit 46 is shown. Instruction decode unit 46 includes an instruction alignment unit 60, a plurality of decoder circuits including decoder circuits 62A–62D (collectively referred to as decoder circuits 62), and an escape decoder unit 64. More or fewer decoder circuits 62 may be included in various embodiments. Instruction alignment unit 60 is coupled to receive instructions fetched from instruction cache 42, and to align instructions to decoder circuits 62. Instructions are also conveyed to escape decoder unit 64 upon instruction buses 72A–72D. Each decoder circuit 62 decodes the instruction received from instruction alignment unit 60 to determine the register operands manipulated by the instruction as well as the unit to receive the instruction. An indication of the unit to receive the instruction as well as the instruction itself are conveyed upon a plurality of dispatch buses 68 to execute units 48 and load/store unit 50. Other buses, not shown, are used to request register operands from reorder buffer 52 and register file 54.

Upon detection of an escape instruction, escape decoder unit 64 begins dispatching subsequent instructions upon DSP dispatch bus 56 to bus interface unit 40 (in microprocessor 12A) or DSP unit 14A (in microprocessor 12B). An asserted complete signal upon complete conductor 28 indicates that the instruction has been completed (or accepted into a buffer, as noted above). Additionally, hold signals are asserted upon a hold dispatch bus 70 coupled between escape decoder unit 64 and decoders 62. The asserted hold signals cause decoders 62 to ignore instructions conveyed from instruction alignment unit 60. Therefore, decoders 62 do not attempt to decode and dispatch instructions from the alternate instruction set to execute units 48 or load/store unit 50.

It is noted that, in one embodiment, an instruction received by decoder circuit 62A is prior to an instruction concurrently received by decoder circuit 62B in program order. Similar relationships exist between other decoder circuits 62. When escape decoder unit 64 detects an escape instruction, hold signals upon hold dispatch bus 70 are asserted: (1) to the decoder circuit 62 which receives the escape instruction; and (2) to the decoder circuits 62 which receive instructions subsequent to the escape instruction in program order. Decoder circuits 62 which receive instructions prior to the escape instruction receive deasserted hold signals. The instructions prior to the escape instruction which are decoded concurrently with the escape instruction are thereby dispatched to execute units 48 or load/store unit 50. Similarly, when the number of instructions indicated by the escape instruction is exhausted, decoder circuits 62 receiving instructions which are conveyed to decoder circuits 62 concurrently with the final instructions from the alternate instruction set receive deasserted hold signals. These instructions are thereby dispatched concurrently with dispatch by escape decoder circuit 64 of the final instructions belonging to the alternate instruction set.

Each of decoder circuits 62 is configured to convey an instruction upon one of dispatch buses 68, along with an indication of the unit or units to receive the instruction. In one embodiment, a bit is included within the indication for each of execute units 48 and load/store unit 50. If a particular bit is set, the corresponding unit is to execute the instruction. If a particular instruction is to be executed by more than one unit, more than one bit in the indication may be set.

Instruction alignment unit 60 is included to route instructions to decoder circuits 62. In one embodiment, instruction alignment unit 60 includes a byte queue in which instruction bytes fetched from instruction cache 42 are queued. Instruction alignment unit 60 locates valid instructions from within the byte queue and dispatches the instructions to respective decoder circuits 62. In another embodiment, instruction cache 42 includes predecode circuitry which predecodes instruction bytes as they are stored into instruction cache 42. Start and end byte information indicative of the beginning and end of instructions is generated and stored within instruction cache 42. The predecode data is transferred to instruction alignment unit 60 along with the instructions, and instruction alignment unit 60 transfers instructions to the decoder circuits 62 according to the predecode information.

Instruction alignment unit 60 may be configured similar to the disclosure of the commonly assigned, co-pending patent application entitled: "A High Speed Instruction Alignment Unit for a Superscalar Microprocessor", Ser. No. 08/421,669, now abandoned, filed Apr. 12, 1995 by Johnson, et al. The disclosure of this patent application is incorporated herein by reference in its entirety. Additionally, instruction alignment unit 60 may be configured to pass instructions through without attempting to perform alignment during times in which escape decoder unit 64 is dispatching instructions upon DSP dispatch bus 56. Escape decoder 64 detects the boundaries of the instructions and routes the instructions appropriately.

Figure 5:
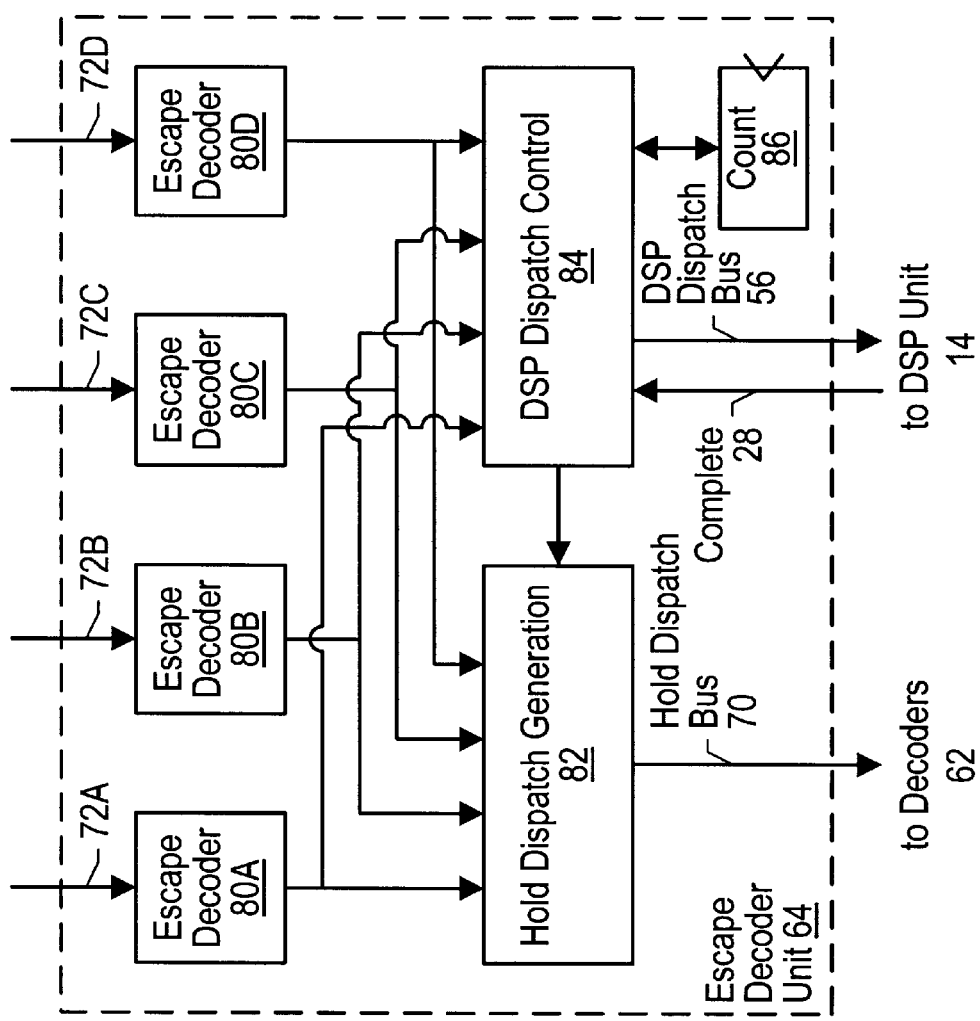
FIG. 5 is a block diagram of one embodiment of the escape decode unit shown in FIG. 4.

Turning next to FIG. 5, a block diagram of one embodiment of escape decoder unit 64 is shown. In this embodiment, escape decoder unit 64 includes a plurality of escape decoder circuits 80A–80D (collectively referred to as escape decoder circuits 80), a hold dispatch generation circuit 82, a DSP dispatch control circuit 84, and a count register 86. Decoder circuits 80 are each coupled to respective instruction buses 72, and are further coupled to hold dispatch generation circuit 82 and DSP dispatch control circuit 84. Hold dispatch generation circuit 82 is coupled to hold dispatch bus 70 and to DSP dispatch control circuit 84. DSP dispatch control circuit 84 is coupled to complete conductor 28, DSP dispatch bus 56, and count register 86.

Escape decoder circuits 80 are each configured to decode an instruction received upon instruction buses 72. If the received instruction is an escape instruction, the escape decoder 80 asserts a signal to both hold dispatch generation circuit 82 and DSP dispatch control circuit 84. Additionally, the instructions received by escape decoder circuits 80 are conveyed to DSP dispatch control unit 84.

Upon receiving an asserted signal indicative of an escape instruction from escape decoder circuits 80, hold dispatch generation circuit 82 generates hold signals for each decoder circuit 62 within instruction decode unit 46. Hold signals are asserted for the decoder circuit 62A–62D which is decoding the escape instruction, as well as for decoder circuits 62 which are decoding instructions subsequent to the escape instruction in program order. Hold signals are also asserted according to indications from DSP dispatch control circuit 84 that additional DSP instructions are being dispatched during the current clock cycle. In one embodiment, DSP dispatch control circuit 84 conveys the count of DSP instructions remaining. When the count is greater than the number of decoder circuits 62, each hold signal upon hold dispatch bus 70 is asserted. When the count is less than the number of decoder circuits 62, hold signals are asserted to a number of decoder circuits 62 equal to the count, and the remainder of the hold signals are deasserted. In this manner, instructions subsequent to the sequence of DSP instructions are dispatched by decoder circuits 62.

DSP dispatch control circuit 84 also receives the signal indicative of a detected escape instruction from escape decoder circuits 80. DSP dispatch control circuit 84 further receives the instructions conveyed to each decoder circuit 80A–80D. DSP dispatch control circuit 84 retrieves the count of DSP instructions from the escape instruction. Instructions subsequent to the escape instruction which are conveyed concurrently with the escape instruction are dispatched upon DSP dispatch bus 56, and the count is decremented by the number of instructions dispatched. DSP dispatch control circuit 84 stores the resulting count in count register 86.

During subsequent clock cycles, DSP instructions continue to be dispatched upon DSP dispatch bus 56 and the count stored in count register 86 is decremented until the count is exhausted. If an asserted complete signal is not received upon complete conductor 28 for instructions dispatched during a clock cycle, DSP dispatch control circuit 84 stalls subsequent instruction dispatch until the asserted complete signal is received. Various stall mechanisms are well known, and DSP dispatch control circuit 84 may employ any suitable stall mechanism.

It is noted that the function provided by escape decoder circuits 80 may be included within decoder circuits 62 in another embodiment. Signals indicative of detected escape instructions would then be conveyed to escape decoder unit 64 by decoder circuits 62. It is further noted that DSP dispatch control circuit 84 may be configured to detect branch instructions. If a branch instruction branches to an instruction prior to the branch instruction within the instruction sequence, DSP dispatch control circuit 84 increments the count stored in count register 86 by the number of instructions between the branch instruction and the target of the branch. If a branch instruction branches to an instruction subsequent to the branch instruction within the instruction sequence, DSP dispatch control circuit 84 decrements the count by the number of instructions between the branch instruction and the target of the branch. If a branch out of the instruction sequence is detected, the count is set to zero. Instruction fetching and execution then continue in execute units 48.

Figure 6:
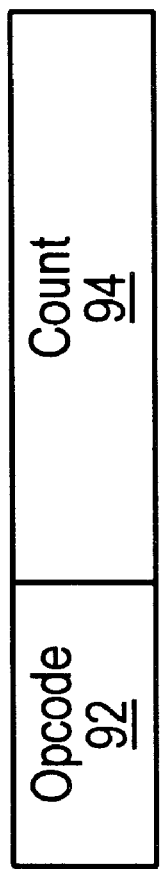
FIG. 6 is a diagram of one embodiment of an escape instruction.

Turning now to FIG. 6, an exemplary escape instruction 90 is shown. Escape instruction 90 includes an opcode field 92 and a count field 94. Opcode field 92 identifies the escape instruction from other instructions within the microprocessor architecture employed by microprocessor 12. In embodiments of microprocessor 12 employing the x86 microprocessor architecture, opcode field 92 comprises one or two bytes identifying the instruction. Count field 94 encodes the number of instructions from the alternate instruction set which follow the escape instruction. In one embodiment, count field 94 comprises one byte, allowing for up to 255 subsequent instructions to be instructions from the alternate instruction set. If more than 255 consecutive instructions are used in a particular instruction sequence, then a second escape instruction may be included within the instruction sequence after 255 instructions to cause additional instructions to be dispatched to the DSP.

Figure 7:
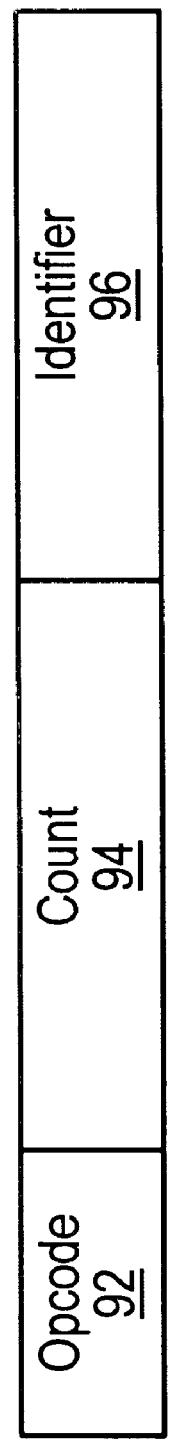
FIG. 7 is a diagram of a second embodiment of an escape instruction.

Turning now to FIG. 7, a second embodiment of the escape instruction 90A is shown. Escape instruction 90A includes opcode field 92 and count field 94, similar to escape instruction 90. Additionally, an identifier field 96 is included in escape instruction 90A. Escape instruction 90A may be employed in embodiments of microprocessor 12 which execute instructions from more than two instruction sets. Microprocessor 12 may include different execute units 48 configured to execute instructions from each of the employed instruction sets. Furthermore, escape decoder unit 64 may be configured to direct the dispatch of instructions to the appropriate execute units upon detection of the escape instruction.

Because more than two instruction sets may be executed by microprocessor 12, escape instruction 90A indicates which instruction set is being switched to. Identifier field 96 is provided for this purpose. Identifier field 96 includes sufficient bits to uniquely encode a value for each possible instruction set. For example, if microprocessor 12 executes instructions from four different instruction sets, then identifier field 96 may include two bits. Four different values may be encoded for the four different available instruction sets.

In one embodiment, one of the instruction sets comprises the x86 instruction set. For this embodiment, the x86 instruction set is considered a primary instruction set executed by microprocessor 12 by default. Escape instruction 90A causes subsequent instructions to be interpreted according to the instruction set identified by identifier field 96. Count field 94 identifies the number of instructions from the identified instruction set. Once the number of instructions defined by count field 94 have been executed, execution returns to the x86 instruction set.

In another embodiment, the x86 instruction set is executed by default by microprocessor 12. For this embodiment, however, the escape instruction signifies a switch to another instruction set for an undetermined number of instructions. Another escape instruction, encoded in the instruction set switched to, is used to switch back to the x86 instruction set or to another of the instruction sets supported by microprocessor 12. Count field 94 is eliminated from escape instructions 90A for this embodiment.

It is noted that, although the above embodiments show one DSP 14 or DSP unit 14A, embodiments including multiple DSPs or DSP units are contemplated. It is further noted that, although the x86 microprocessor architecture and the ADSP 2171 are used as exemplary embodiments above, other microprocessor and DSP architectures may be used in similar embodiments.

In accordance with the above disclosure, an instruction decode unit including an escape decoder unit has been described. The escape decoder unit detects an escape instruction which indicates that subsequent instructions are instructions from an alternate instruction set. In one embodiment, the number of subsequent instructions which belong to the alternate instruction set is encoded into the escape instruction. Advantageously, instructions may be employed from either instruction set to perform a particular function. The instructions (and associated execution units) which are most efficient for performing the particular function may be selected, allowing a program to enjoy enhanced performance compared to that previously achievable using a single instruction set.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   an instruction cache configured to store a plurality of instructions, wherein said plurality of instructions includes instructions from a first instruction set and instructions from a second instruction set;
   an instruction decode unit coupled to receive said plurality of instructions from said instruction cache;
   one or more first execution units operable to execute said instructions from said first instruction set;
   a second execution unit operable to execute said instructions from said second instruction set;
   wherein said instruction decode unit is configured to dispatch said instructions from said first instruction set to said one or more first execution units, to detect an escape instruction in said plurality of instructions, and in response to a value encoded in said escape instruction to dispatch a plurality of subsequent instructions from the second instruction set to said second execution unit, wherein a total number of said subsequent instructions from said second instruction set dispatched to said second execution unit is dependent on said value encoded in said escape instruction, wherein said instruction decode unit is further configured to resume dispatch of said instructions from said first instruction set to said one or more first execution units in response to completion of said dispatching of said total number of said subsequent instructions to said second execution unit;

wherein said instruction decode unit includes:
one or more decoder circuits, wherein said one or more decoder circuits are coupled to receive said plurality of instructions, and configured to decode said instructions from said first instruction set, and dispatch said instructions from said first instruction set to said one or more first execution units;
an escape decoder unit coupled to said one or more decoder circuits, wherein said escape decoder unit is coupled to receive said plurality of instructions concurrently with said one or more decoder circuits, wherein said escape decoder unit is configured to detect said escape instruction, and dispatch said subsequent instructions from said second instruction set to said second execution unit in response to said detection of said escape instruction;
wherein said escape decoder unit includes a count register, wherein said count register is configured to store a value indicative of a remaining number of said subsequent instructions from said second instruction set to be dispatched to said second execute unit, wherein said escape decoder unit loads said count register with said total number in response to said detection of said escape instruction, wherein said escape decoder unit decrements said count register upon dispatching each of said subsequent instructions from said second instruction set to said second execution unit.

2. The microprocessor as recited in claim 1 wherein said escape decoder unit is configured to disable selected ones of said one or more decoder circuits from dispatching said subsequent instructions from said second instruction set to said one or more first execution units in response to said detection of said escape instruction.

3. The microprocessor as recited in claim 2 wherein each of said one or more decoder circuits is configured to receive an instruction of said plurality of instructions in a single clock cycle.

4. The microprocessor as recited in claim 3 wherein said escape decoder unit is configured to disable decoder circuits which receive said escape instruction or any of said subsequent instructions during a first clock cycle in which said escape instruction is detected.

5. The microprocessor as recited in claim 1 wherein said second execution unit comprises a digital signal processing unit.

6. A method for executing instructions from a first instruction set and a second instruction set within a computer system, comprising:
fetching a plurality of instructions from a main memory, wherein said plurality of instructions includes instructions from said first instruction set and said second instruction set;
decoding said plurality of instructions fetched from said main memory, wherein said decoding includes:
dispatching instructions from said first instruction set to one or more first execution units;
detecting an escape instruction within said plurality of instructions;
dispatching a plurality of subsequent instructions from said second instruction set to said second execution unit in response to a value encoded in said escape instruction, wherein a total number of said subsequent instructions from said second instruction set dispatched to said second execution unit is dependent on said value encoded in said escape instruction;
resuming dispatch of said instructions from said first instruction set to said one or more first execution units in response to completion of said dispatching of said subsequent instructions to said second execution unit;
said one or more first execution units executing said instructions from said first instruction set; and
said second execution unit executing said subsequent instructions from said second instruction set;
wherein said decoding of said plurality of instructions is implemented by an instruction decoder which comprises one or more decoder circuits and an escape decoder unit, wherein said decoding of said plurality of instructions includes:
said one or more decoder circuits receiving said plurality of instructions, decoding said instructions from said first instruction set, and dispatching said instructions from said first instruction set to said one or more first execution units;
said escape decoder unit receiving said plurality of instructions concurrently with said one or more decoder circuits, detecting said escape instruction, and dispatching said subsequent instructions from said second instruction set to said second execution unit in response to said detection of said escape instruction;
said escape decoder unit loading a count register with said total number in response to said detection of said escape instruction, and decrementing said count register upon dispatching any of said subsequent instructions from said second instruction set to said second execution unit, wherein said count register indicates a remaining number of said subsequent instructions from said second instruction set to be dispatched to said second execute unit.

7. The method as recited in claim 6 wherein said second execution unit comprises a digital signal processing unit configured within said microprocessor.

8. The method as recited in claim 6 wherein said second execution unit comprises a digital signal processor residing external to said microprocessor.

9. The method of claim 6, wherein said decoding of said plurality of instructions further comprises:
said escape decoder unit disabling selected ones of said one or more decoder circuits from dispatching said subsequent instructions from said second instruction set to said one or more first execution units in response to said detection of said escape instruction;
each of said one or more decoder circuits which receiving an instruction of said plurality of instructions in a single clock cycle;
said escape decoder unit disabling decoder circuits which receive said escape instruction or instructions subsequent to said escape instruction in program order during a first clock cycle in which said escape instruction is detected;
said escape decoder unit disabling all decoder circuits during clock cycles after said first clock cycle until said value in said count register attains a magnitude smaller than the number of said one or more decoder circuits.

10. A microprocessor comprising:

an instruction cache configured to store a plurality of instructions, wherein said plurality of instructions includes instructions from a first instruction set and instructions from a second instruction set;

an instruction decode it coupled to receive said plurality of instructions from said instruction cache;

one or more first execution units operable to execute said instructions from said first instruction set; and a second execution unit operable to execute said instructions from said second instruction set;

wherein said instruction decode unit is configured to dispatch said instructions from said first instruction set to said one or more first execution units, to detect an escape instruction in said plurality of instructions, and to dispatch a first number of subsequent instructions from said second instruction set to said second execution unit in response to said detection of said escape instruction, wherein said first number of subsequent instructions dispatched to said second execution unit is dependent upon a value specified by said escape instruction, wherein said instruction decode unit is further configured to resume dispatch of said instructions from said first instruction set to said one or more first execution units in response to completion of said dispatching of said first number of subsequent instructions to said second execution unit;

wherein said instruction decode unit includes:

one or more decoder circuits, wherein said one or more decoder circuits are coupled to receive said plurality of instructions, and configured to decode said instructions from said first instruction set, and dispatch said instructions from said first instruction set to said one or more first execution units;

an escape decoder unit coupled to said one or more decoder circuits, wherein said escape decoder unit is coupled to receive said plurality of instructions concurrently with said one or more decoder circuits, wherein said escape decoder unit is configured to detect said escape instruction, and dispatch said first number of subsequent instructions from said second instruction set to said second execution unit in response to said detection of said escape instruction;

wherein said escape decoder unit includes a count register, wherein said count register is configured to store a value indicative of a remaining number of said subsequent instructions from said second instruction set to be dispatched to said second execution unit, wherein said escape decoder unit loads said count register with said first number in response to said detection of said escape instruction, wherein said escape decoder unit decrements said counter register upon dispatching said subsequent instructions from said second instruction set to said second execution unit;

wherein said escape decoder unit is configured to disable selected ones of said one or more decoder circuits from dispatching said subsequent instructions from said second instruction set to said one or more execution units in response to said detection of said escape instruction;

wherein each of said one or more decoder circuits is configured to receive an instruction of said plurality of instructions in a single clock cycle;

wherein said escape decoder unit is configured to disable decoder circuits which receive said escape instruction or instructions subsequent to said escape instruction in program order during a first clock cycle in which said escape instruction is detected;

wherein said escape decoder unit is configured to disable all decoder circuits during clock cycles after said first clock cycle until said value in said count register attains a magnitude smaller than the number of said one or more decoder circuits.

11. The microprocessor as recited in claim 10 wherein said escape decoder unit is configured to enable decoder circuits which receive instructions following said first number of subsequent instructions from said second instruction set.

* * * * *

UNITED STATES PATENT AND TRADEMARK OFFICE
CERTIFICATE OF CORRECTION

PATENT NO. : 5,968,162
DATED : October 19, 1999
INVENTOR(S) : Christopher J. Yard It is certified that error appears in the above-identified patent and that said Letters Patent is hereby corrected as shown below:

Claim 10, col. 15, line 8, please change "it" to "unit".

Signed and Sealed this

Fourth Day of April, 2000

Attest:

Q. TODD DICKINSON

Attesting Officer

Director of Patents and Trademarks